United States Patent [19]

Freundt

[11] Patent Number: 4,557,595
[45] Date of Patent: Dec. 10, 1985

[54] OPTICAL APPARATUS FOR EXPOSURE AND/OR IMAGE REPRODUCTION OF MICROFICHE SHEET FILM, AND CASSETTE SUITABLE THEREFOR

[76] Inventor: Klaus Freundt, Amselweg 15, 6472 Altenstadt, Fed. Rep. of Germany

[21] Appl. No.: 510,316

[22] Filed: Jul. 1, 1983

[30] Foreign Application Priority Data

Jul. 3, 1982 [DE] Fed. Rep. of Germany ....... 3224898

[51] Int. Cl.$^4$ .............................................. G03B 27/58
[52] U.S. Cl. .................................. 355/72; 353/27 A; 353/27 R; 353/103
[58] Field of Search ............... 355/72, 74, 44; 353/25, 353/103, 114, 116, 27 A, 27 R, DIG. 1

[56] References Cited

U.S. PATENT DOCUMENTS

| | | | |
|---|---|---|---|
| 2,982,177 | 5/1961 | Briskin et al. | 353/103 |
| 3,754,817 | 8/1973 | Iida et al. | 353/27 A |
| 3,997,257 | 12/1976 | Wells | 353/27 R |
| 4,049,342 | 9/1977 | Hearon | 353/27 R |
| 4,184,764 | 1/1980 | Bailey et al. | 353/27 A |

Primary Examiner—Monroe H. Hayes
Attorney, Agent, or Firm—Larson and Taylor

[57] ABSTRACT

The apparatus can be an apparatus for exposure and/or image reproduction of microfiche sheet film. It comprises a cassette (24) arranged releasably in a holding arrangement (54, 56) and containing a plurality of microfiche film sheets in separate guides, an optical arrangement (14) and a transporting arrangement (16, 62, 64) for transporting individual microfiche film sheets between the cassette (24) and the optical arrangement. To protect the microfiche film sheets from dust and possibly light, it is proposed that the cassette (24) is insertable in the closed state into the holding arrangement (54, 56), and the removal opening of the guide of the microfiche film sheet to be transported to the optical arrangement (14), and an engagement zone at said sheet for the transporting arrangement (16, 62, 64), are adapted to be laid open by an opening mechanism. The cassette (24) is so constructed that the cassette is opened by the same movement with which the positioning of the guides receiving the microfiche film sheets in relation to the transporting plane is effected.

20 Claims, 3 Drawing Figures

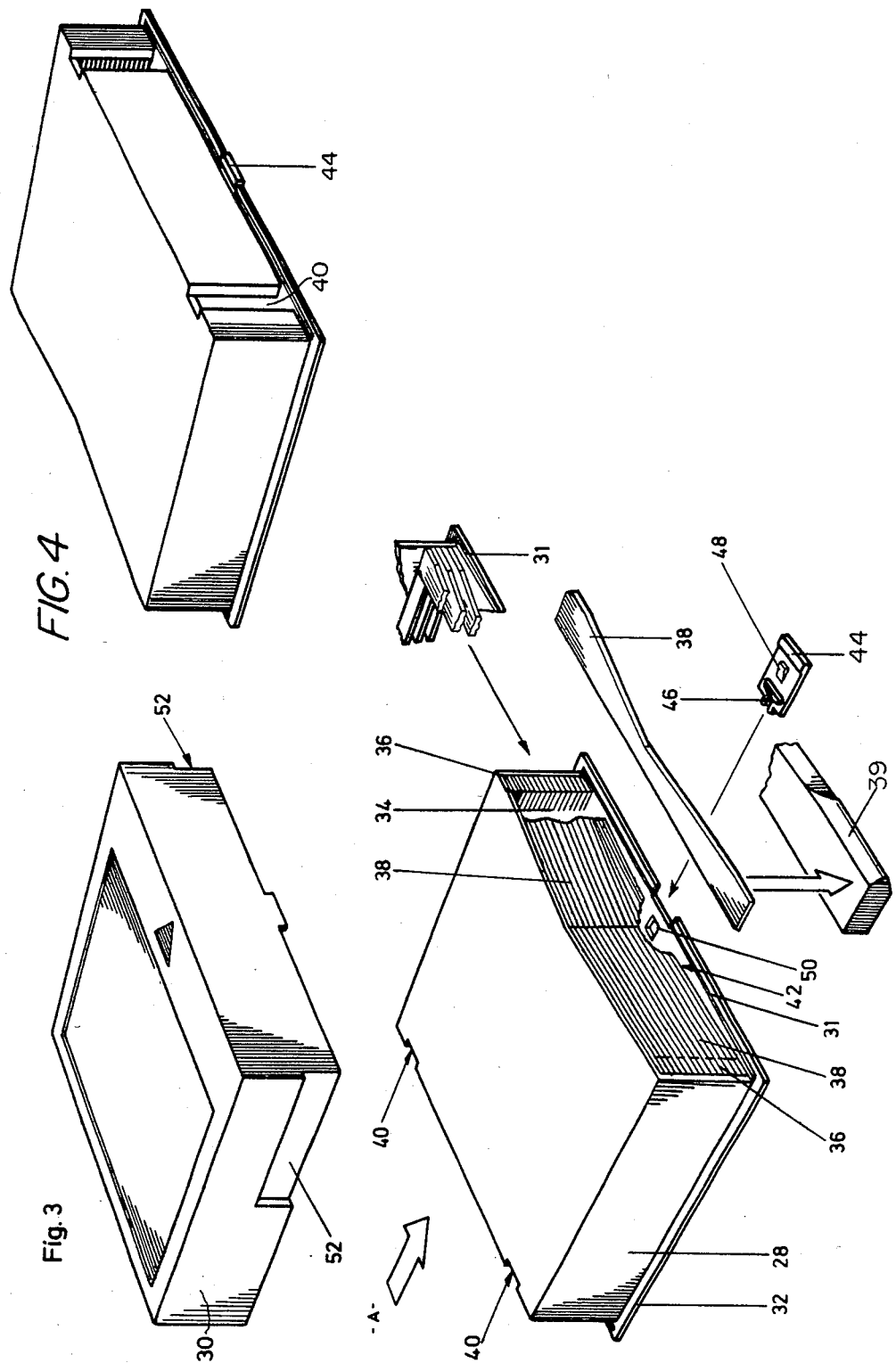

OPTICAL APPARATUS FOR EXPOSURE AND/OR IMAGE REPRODUCTION OF MICROFICHE SHEET FILM, AND CASSETTE SUITABLE THEREFOR

DESCRIPTION

The invention relates to an optical apparatus for exposure and/or image reproduction of microfiche film sheets, comprising a cassette situated releasably in a holding arrangement and containing a plurality of microfiche film sheets each in separate guides, an optical arrangement, and a transporting arrangement for transporting individual microfiche film sheets between their guide means in the cassette and the optical arrangement. The invention also relates to a cassette with microfiche film sheets held in separate parallel guides for use in an apparatus of the aforesaid type.

Microfiche film sheets are used as well as roll films and magnetic storage media for concentrated information storage. The apparatus and processes for the filming of drawings and text-containing documents on sheet film, for duplication and for picture or image reproduction, have been known for a fairly long time and have proved to be successful. But the handling of film sheets in practical work appears to be in need of improvement.

Hitherto the unexposed film material has been delivered and stored in suitable packs. Then the developed films are packed in another way and where possible stored in such a manner that a specific microfiche can be found and taken up as quickly as possible. Various systems, so-called retrieval systems, have been developed for finding specific data on a specific microfiche element. They all start from the developed film sheet, and normally arrange thereon an identification which identifies each microfiche element so that it can be subsequently found and taken from the store.

To allow the microfiche elements to be identified it is known to insert them in transparent sleeves or wallets which are each provided with external tabs or riders at the edge and are stored in this form in a cassette without individual guides. Identification is by means of the different tabs on the wallets, and these are of such a size that they are not taken completely out of the cassette in the reading apparatus, so that they can also be put back into the original position again in the cassette without difficulty. On the other hand the size of the wallets and of the cassette is a disadvantage, and further disadvantages result from the fact that the sequence of the wallets in the cassette cannot be altered, and that the wallets sliding directly on one another become electrostatically charged, attract dust, and quickly become scratched.

The marking means may also be in known manner in the form of a binary coded metal strip arranged on the edge of the microfiche elements. In a known apparatus up to 780 microfiche elements identified in this way can be stacked in a revolving magazine. But the system is relatively costly and therefore would be considered for use only where such great quantities of data actually have to be kept in readiness for very quick access. In most practical applications, users manage with very much smaller quantities of rapid-access data. In the case of the known system also the need to arrange a metal strip on each microfiche element involves complication and expense.

Finally, it has also been already known to house 256 microfiche elements in each case in guides in two elongated, laterally open magazines of a reading apparatus. This again is a large and expensive installation. The elongated magazine boxes are filled with fully developed microfiche elements outside the apparatus, handled in the open state, and inserted in the apparatus thus. Practical difficulties are involved when readily flexible microfiche elements held close to one another in individual guides have to be taken up directly at the removal opening and drawn out of the guide.

The invention has as its objects to provide an optical apparatus of the kind initially specified with an associated cassette which offers optimum protection for the microfiche film sheets, facilitates the handling of the latter outside the apparatus, and ensures simple and reliable mechanical operations.

The above object is achieved according to the invention in that the cassette is insertable in the closed state into the holding arrangement, and an opening mechanism is adapted to lay open the removal opening of the guide of the microfiche film sheet to be transported to the optical arrangement and also a zone at the sheet at which the transporting arrangement can engage.

Since, in the case of the apparatus according to the invention, the cassette is inserted in the closed state it is unimportant whether the film sheet is as yet unexposed or has already been developed. As a result it is possible to use the same cassettes both for the unexposed films and also for the microfiche elements. Even if no use is made of this possibility the closed cassette, which in this case does not even have to be impervious to light, offers considerable advantages when dealing with the microfiche elements. In contrast to what is the case with individual microfiche elements it is readily possible to identify a strong cassette for e.g. 10, 20 or 30 microfiche elements in such a way that a plurality of cassettes can be visually distinguished and sorted and also mechanically recognised. For example textual distinguishing data and contents lists, also visual or magnetic codings, can be arranged on the individual cassettes. The microfiche elements themselves then no longer need to be explored individually according to a specific order identification when a specific microfiche element is being sought, since they are clearly determined by their position in a specific guide in the cassette. The sequence of the microfiche elements in the guides of the cassette side by side or below one another can be changed at any time without additional measures.

It is to be taken into consideration in this connection that a very few small cassettes with up to about 30 or possibly 50 microfiche elements suffice for most uses, since several hundred pictures can be accommodated on each microfiche element depending on the enlargement scale. Therefore, usually it will also suffice to store some cassettes to be ready to hand and to insert the required cassette in each case manually into the optical apparatus. If it is a question of a very large number of microfiche elements, the strong cassettes, standardised in dimensions, can readily be machine-sorted also with the use of the coding arranged thereon, and searched out individually and fed to the optical apparatus.

The arrangement of the microfiche elements in handy closed cassettes and moreover in individual guides therein ensures satisfactory image reproduction for the first time. Microfiche reading apparatus often have to operate in dust-containing environments e.g. in motor vehicle workshops, to store technical data and prices of a large number of spare parts in a condensed manner and to keep them in readiness for rapid availability. The dusty environment in conjunction with the property which film material and synthetic plastic sheets have of attracting dust by electrostatic charging, normally leads very quickly to soiling in the case of microfiche elements which are handled in an open way and which slide on one another. Therefore it has often been thought necessary to work with photographic negatives, in other words light script or text on a dark background, since dust deposits occur less with these. But such microfiche elements require greater light intensity in the optical apparatus, resulting in further technical complications. It is also generally preferred to represent photographic positives in reading apparatus. The invention allows the use of these even under difficult environment conditions, since the microfiche elements go into the optical apparatus in the closed cassette, and the separate guides also substantially obviate electrostatic charging.

Optical viewing apparatus according to the invention with associated cassettes are of course also suitable for film sheets in the form of microfilm wallets or jackets.

An important advantage of the new reading apparatus with cassettes resides in their simplicity and the advantageous price/capacity relationship as compared with known apparatus with associated relatively large magazines for microfiche elements. Whereas the latter need special large feed devices, a reading apparatus according to the invention can be constructed substantially like known simple and very inexpensive reading apparatus into which microfiche elements are introduced individually. The only difference being that a single cassette is now introduced instead of an individual microfiche element. If in a preferred form of the invention the cassette has at least one cover part to be opened by movement at right angles to the planes of the guides of the microfiche film sheets, and in the opened state of a guide a portion of the edge of a microfiche film sheet received therein is held exposed physically at both sides, it requires basically only an additional controllable transverse drive as well to move the cassette in the holding arrangement in a direction at right angles to the planes of the guides of the microfiche film sheets, to open without additional outlay, and to position it relatively to a plane of transport of the transporting arrangement. The surprising simplicity of the new apparatus is due to the fact that the positioning movement is used at the same time for opening the cassette. Also the positioning movement can be relatively short, and therefore precise, since about 1 mm suffices as a spacing between microfiche film sheets in the guides of the cassette. The spacing chosen may be even smaller if a rather greater constructional outlay is acceptable.

To take a specific microfiche element partly out of the opened cassette, to then engage it reliably and transport it to the optical arrangement, in an advantageous form of the invention it is proposed that adjacent the holding arrangement, at the side opposite from the removal openings of the guides of the microfiche film sheets in the cassette, there is arranged a movable narrow push member which when operated can advance the microfiche film sheet situated in the transport plane partly out of its guide outwardly from the cassette into a position wherein it can be taken up by other transporting elements of the transporting arrangement. These may be e.g. transporting rollers which are mounted on a carriage which is positionable and is guided to be displaceable in the direction of their axes of rotation, as is known in the case of simple microfiche reading apparatus. The reliable positioning of the microfiche element relatively to the optical arrangement for viewing a single image is preferably achieved in that the optical axis intersects the plane of transport of the transporting arrangement between the axes of rotation of two pairs of transporting rollers, which are driven at the same circumferential speed by a common drive.

The return of a microfiche element from the optical arrangement into the cassette can be effected by means of the said transporting rollers, at the end of the returning movement possibly with assistance of an additional pusher or of gravitational force. In order that when this happens a microfiche element does not strike against the boundary of the introduction opening of its guide in the cassette, the guides consist of ribs at least at the lateral inner wall surfaces of the cassette, and also of separating webs which bound the removal openings and whose outer edge is taken in in V-shaped manner from the sides towards the middle.

The control system outlay increases suddenly with the number of microfiche elements housed in a cassette. To obtain the greatest possible efficiency with a relatively simple construction, in a preferred practical construction it is proposed that a cassette has 31 guides in which it can accommodate a corresponding number of microfiche film sheets. The outlay for controlling 30 microfiche film sheets would not be less, but would be immediately very much greater in the case of a 32-film cassette. The cassette with 31 microfiche elements has e.g. a height of 37 mm. A smaller cassette should then have a height of 18 mm so that two of the smaller cassettes make up the height of a larger cassette, with a 1 mm intervening gap. The smaller cassettes could each house 12 microfiche elements.

The invention will be elucidated hereinafter with reference to the drawings. In these drawings:

FIG. 3 is a perspective exploded view of a microfiche cassette used with the apparatus according to FIGS. 1 and 2; and FIG. 4 is a rear perspective view of the inner main part depicted in FIG. 3 viewed along arrow -A-.

Figure 1:
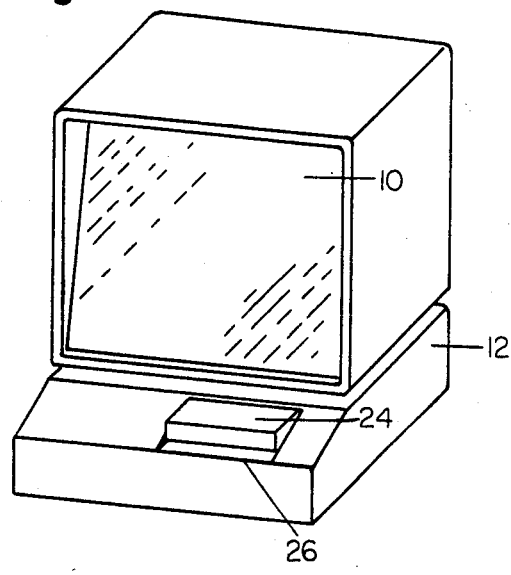
FIG. 1 shows a perspective view of a microfiche reading apparatus.
Figure 2:
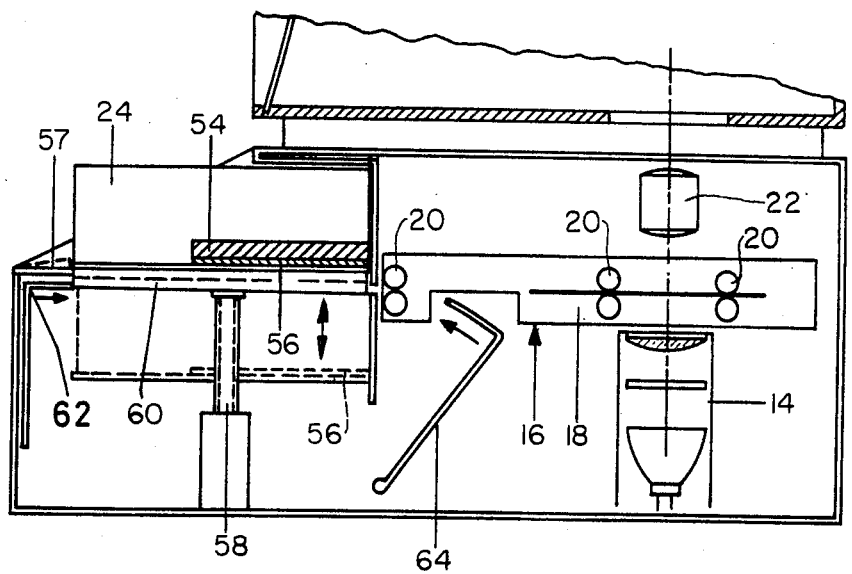
FIG. 2 shows a simplified cross-section through the reading apparatus according to FIG. 1.

The microfiche reading apparatus shown in FIGS. 1 and 2 is of conventional construction. It comprises a screen 10 and a lower part 12 which houses in the usual way a light source not shown here, an optical arrangement given the general reference numeral 14 in FIG. 2, and a transporting apparatus 16 for an individual microfiche element. The screen 10, the light source and the optical arrangement 14 are of conventional construction and therefore do not need to be elucidated in more detail.

The transporting arrangement 16 comprises a carriage 18 which is positionable and is guided to be displaceable in the transverse direction of the apparatus by a drive not shown here e.g. using an electric motor and guide spindle, and a plurality of pairs of transporting rollers adapted to be driven at the same circumferential speed are mounted in a parallel arrangement on the said carriage. A microfiche element lying on the film platform of the carriage 18 is conveyed in the longitudinal direction and positioned by means of the transporting roller pairs 20. Thus through the controlled longitudinal movement by means of the transporting rollers 20 and the controlled transverse movement through travel of the entire carriage 18, each individual picture on a microfiche element can be guided to the optical axis 22 of the optical arrangement 14. Further details of the precise positioning of a microfiche element relatively to the optical arrangement 14 are gone into further hereinafter in connection with the description of the way in which the apparatus operates.

With conventional simple microfiche reading apparatus individual microfiche elements or two microfiche elements side by side are laid on a horizontally displaceable carriage and brought by hand or by a positioning control device into the particular position required in relation to the optical arrangement 14. Instead, in the illustrated microfiche reading apparatus according to the invention a cassette 24 with a relatively large number of microfiche elements is inserted manually or by a selecting and feeding device not shown here into a suitable insertion slot 26 (FIG. 1) at the front side of the lower part 12 of the apparatus. The usual switches and other operating elements required for controlling the apparatus, which have not been shown here, can be provided near the insertion slot 26.

For further description of the apparatus the construction of the cassette 24 shown in FIG. 3 must first of all be discussed. This cassette comprises an inner main part 28 and an outer cover part 30 which is placed like a lid from above onto the main part 28 and extends over the latter at all sides down to a base sheet or panel 32.

In the position shown in FIG. 3 the main part 28 contains a plurality of horizontal guides 34 into which microfiche elements can be inserted, one into each. The centre to centre distance of two neighbouring guides 34 amounts to about 1 mm. 31 such guides for example may be provided, but the number may be any other number which can be accommodated in a handy cassette 24.

The guides 34 may be partition walls, parallel to the base panel 32, in the interior of the box-shaped main part 28. Instead of full-area partition walls the guides or individual compartments for the individual microfiche elements may also be formed of relatively short ribs 36 at the inner sides of the side walls of the main part 28 of the cassette and of separating webs 38 extending over the width thereof. Ribs 36 may also be provided at the inner side of the rear wall of the main part 28 of the cassette. In this way the result is achieved that the microfiche elements have guidance and rest on the edge all round.

The thickness of the ribs 36 and of the webs 38 amounts in the example to 0.6 mm, so that a free spacing of about 0.4 mm obtains between the ribs or separating webs. These dimensions may vary depending on the material used for the ribs and the separating webs, the thickness and rigidity of the film material and the precision of the control of the transporting arrangement 16. Average dimensions are given here of the sort which can be achieved in actual practice without considerable difficulties. In the example the ribs 36 and likewise the parts 28 and 30 of the cassette can be made of synthetic plastic material, whereas primarily a metal e.g. aluminium alloy, but possibly synthetic plastic material also, could be considered for the separating webs 38. The ribs 36 may be moulded directly on the side walls of the main part 28 of the cassette and if appropriate also on the rear wall. But for reasons of manufacturing technique it may be advisable to arrange the lateral ribs 36 on guide rails constructed as separate parts which can be inserted into matching longitudinal grooves in or beside the side walls of the main part 28 of the cassette and fixed in their final position. The separating webs 38 also are inserted into matching longitudinal grooves in the side walls of the main part 28 of the cassette or in the guide rails with the ribs 36 and secured e.g. by means of an adhesive substance. It will be appreciated that the lateral ribs 36 because of the separating webs 38 cannot extend to the removal opening of the cassette but must set back by the amount of the width of the separating webs 38. In the finally assembled state the lateral ribs 36 are then prolonged in the separating webs 38 which are in line with them and which, as the drawings show, may be taken in from the sides towards the middle in V-shaped manner to facilitate the introduction of the microfiche elements into the cassette.

The front edge of the separating webs 38 will also advantageously be chamfered at both sides in cross-section, as shown at 39.

Further sloping surfaces result from the fact that the side walls of the main part 28 of the cassette preferably come together slightly in sloping fashion internally from the introduction opening to the rear wall, to allow of introducing the microfiche elements safely into the cassette and then centering them with the help of the side walls as they are fully pushed in.

As FIGS. 3 and 4 show, the rear wall of the main part 28 of the cassette comprises cutaways or openings 40 which extend over the entire height closely adjacent the ribs 36 arranged at the side walls. If the rear wall of the main part 28 of the cassette is also provided with ribs 36, these ribs are interrupted in the region of the openings 40. These openings allow operating elements e.g. narrow push members to be moved at the rear side of the opened cassette against an individual microfiche element situated in the cassette and push the said element forwards over a certain distance out from the cassette introducton opening given the general reference numeral 42, so that it can be mechanically engaged there and conveyed onwards.

The cover 30 is to close the openings 40 and 42 of the main part 28 of the cassette 24 as sealing-tight as possible and also in such a way as to close as reliably as possible when the cassette is handled, but on the other hand is to be capable of being opened in a simple manner both manually and also mechanically in the apparatus. The relatively rigid box-shaped construction of the two cassette parts 28 and 30 serves to achieve a tight closure. It is also arranged that the lower edge face of the cover 30 at least at the front and rear sides of the main part 28 engages into corresponding grooves 31 in the upper side of the base panel 32.

To secure the closed state two latch elements 44 are provided which are contructed with spring tongues 46 and can be introduced in the longitudinal direction into matching guides at the underside of the base panel 32 respectively near the front and rear edges of the cassette, and secured by an upper projection 48 latching into a recess 50 in the base panel 32. The recess 50 in the longitudinal direction is so much longer than the projection 48 that under the spring action of the spring tongues 46 or by external force application oppositely to this spring action a limited shifting of the latch elements 44 in the longitudinal direction is possible. These are so shaped at their outer edges that they can engage in corresponding projections or recesses underneath at the front and rear walls respectively of the lid-like cover part 30, and held in engagement by the spring tongues 46.

In the constructional example the side walls of the cover part 30 finish flush with the lateral outer surface of the base panel 32. However, starting from the front wall of the cover part 30, recesses 52 are arranged in both of its side walls along the lower edge thereof. In the region of the recesses 52 the wall thickness of the side walls of the cover part is a little thinner, and in this region in the closed state of the cassette the base panel 32 projects beyond the recessed side wall of the cover part 30 by the amount of the wall thickness difference. In the example the length of the recesses 52 is somewhat greater than half the length of the cassette, and their height can amount to e.g. 12 mm. The depth of the recesses 52, i.e. the reduction in wall thickness in this region, amounts in the case of the example to 1 mm. The base panel 32 projects laterally by this amount relatively to the outer surface of the recesses 52 in the region of such recesses.

As FIG. 3 shows, an inscription panel or area can be provided at the top side of the cover part 30, and on this panel there can be put readable information on the contents of the cassette which is thought to be useful in the individual case concerned. Further data or machine-readable codings may be arranged on the front or rear side and on the side walls of the cover part 30 and finally also on the underside of the base panel 32. A coding e.g. on the side walls of the cover part 30 above or in the recesses 52 can be machine-read when the cassette is introduced into the insertion slot 26.

Since as seen in plan the cassette 24 is only slightly larger than the DIN A6 format of the microfiche elements and jackets it can be comfortably held in the hand, and this supporting hand can also, with one movement, take hold of the two latch elements 44 at the underside of the base panel 32, these being arranged in the longitudinal direction in opposite situations and being shiftable relatively to one another for opening, and also move them against the force of the spring tongues 46 into the opening position. Then with the other hand the cover part 30 can be taken off upwardly and thus the cassette can be opened, to manually introduce, or remove, one or more microfiche elements.

For a description of the mechanical operations in taking out a specific microfiche element from the cassette reference is again made to FIG. 2. This shows that when a cassette 24 is inserted in the insertion slot 26 with the front edge foremost, upper holding elements 54, e.g. in the form of lateral bars, and lower guide elements 56, e.g. in the form of lateral bars also, can enter the recesses 52 at both sides. The bars 54 abut on the upper edge of the recesses 52 whereas the bars 56 come to abut on the upper edge of the base panel 32. The cassette 24 is pushed so far into the insertion slot 26 that the forward latch element 44 impinges against an abutment not shown here and is moved back into the opening position. In the end position the cassette is automatically arrested by a lever strip 57 which is combined with an opening mechanism not shown for a rear latch element 44 which is provided in the case of the present example. The lever strip 57 can serve as a sealing element at the same time. It holds the cassette secured until a release key is actuated. If, in another embodiment, only a single latch element is provided for locking the two parts 28 and 30 of the cassette, the additional opening mechanism for the second latch element can be dispensed with.

In the inserted state the base panel 32 of the cassette rests on a supporting plate 60 adapted to move in a vertical direction by means of a sketchily indicated elevating drive 58. The bars 56 are connected to the supporting plate 60 and are adapted to move together with the latter vertically. Then when after insertion of the cassette 24 in the slot 26 the supporting plate 60 together with the bars 56 is lowered, whilst the bars 54 remain at the former level or are lowered only a short and limited distance, for obtaining a better seal between cassette and insertion slot for example, the cassette is increasingly opened since the cover part 30 is held fast whilst the main part 28, whose base plate 32 is held between the supporting plate 60 and the bars 56, is moved downwards together with these.

The plane of transport of the transporting arrangement 16 is situated close below the lower edge of the cover part 30 held by the bars 54. This arrangement makes it possible for the microfiche element held in the lowest guide 34 of the cassette to be removed from the cassette already when the main part 28 of the cassette has moved downwards only a short distance relatively to the cover part 30. Depending on which microfiche element is to be removed, the main part 28 of the cassette is moved more or less far downwards out of the cover part 30 by the elevating drive 58, which can be controlled to precise positions. The cassette need be fully opened only to take out the uppermost microfiche element.

After the main part 28 of the cassette has been lowered so far that a specific microfiche element has arrived into the plane of transport for the transporting arrangement 16, by means of a follow-up control a push member 62 is operated which has an effective push surface of less than 2 mm height and can advance on the level of the transporting plane through the rear openings 40 into the main part 28 of the cassette, so that the microfiche element situated at this level is advanced for a short distance forwardly out of the removal opening 42 of the cassette. In this advanced position the microfiche element can then be engaged by the transporting rollers 20 and transported further to the optical arrangement. After the microfiche element has been securely engaged by the transporting rollers 20 and precisely aligned by suitable lateral guides at the carriage 18, it arrives with the front or rear edge or another definition serving as a reference line at a photoelectric cell system or some other suitable sensor. Then from this specific position onwards the transporting rollers 20 effect positioning in the longitudinal direction.

To position and effect very precise guiding of the microfiche element in the region of the optical arrangement, a pair of transporting rollers is provided at both sides of the optical axis 22, the pairs being driven in the same direction and at the same circumferential speed.

To return the microfiche element mechanically again into its guide 34 in the cassette after the reading operation there is movably mounted in the region of the introduction and removal opening 42 of the cassette a further push member 64 which finally pushes in completely the microfiche element which has been already pushed to a considerable extent into the cassette by the transporting rollers 20. The main part 28 of the cassette 24 can then be moved downwards or upwards to another level relatively to the plane of transport of the transporting arrangement 16 by means of the elevating drive 58, to then feed another microfiche element contained in the cassette to the optical arrangement 14, or to return the cassette into the closed starting situation, in which it can be removed again from the slot 26.

The invention has been explained above with the use of a microfiche reading apparatus with a screen. It will be understood that it can be used in the same way also with a reading apparatus using a projector, a copier, a photographing or developing apparatus or another optical apparatus operating with unexposed or developed microfiche film material or microfilm wallets. It should also be noted in this connection that the horizontal position of the cassette in the apparatus shown in the example used is not vital. The cassette could also be inserted for example into a vertical slot. The transporting arrangement 16 and possibly the optical arrangement 14 would simply have to be correspondingly aligned in that case.

It will also be clear that the details described hereinbefore regarding the constructon of the cassette 24 and its holding and guiding in the optical apparatus have the character of examples only. The invention could also be carried into effect e.g. with a cassette which is open at one side only, in which case the individual microfiche elements are taken hold of by a suitable gripper device at the introduction and removal opening 42 and drawn out as far as the transporting rollers 20. In that case the openings 40 and the push member 62 would be dispensed with. It would be suficient to have as cover part 30 a slide which closed the opening 42 and which would have to be opened by machine means after insertion of the cassette into the apparatus.

In a further alternative embodiment, in the interests of better sealing-tightness of the cassette in the new state whilst it contains still unexposed film material, the rear opening 40 could be tightly closed by a wall region which is to be broken open later along a desired fracture line.

In a further development of the invention the optical apparatus could comprise two insertion slots 26 for cassettes which would have to be so arranged side by side that the transporting arrangement 16 could be brought to both cassettes and receive microfiche elements from these.

Finally, the new apparatus is preferably so arranged that cassettes and single microfiche elements selectively can be introduced and discharged through the insertion slot 26. For this purpose it is proposed that the plate 60 is provided at the top side with a recess the width of which corresponds to the width of the microfiche elements, so that these are given lateral guidance when they are inserted. The level of the recess is so chosen that in the initial position of the apparatus an individual microfiche element can at any time be inserted into the transporting arrangement 14 through a narrow opening shown in FIG. 2 at the rear end of the insertion slot 26.

I claim:

1. An optical apparatus for the exposure and/or image reproduction of microfiche film sheets, comprising:
    a cassette including (a) an inner part containing a plurality of the parallel microfiche film sheets in preselected respective separating guides, said inner part including a removal opening located along an adjacent set of side edges of the film sheets and an engagement opening located along another adjacent set of side edges of the film sheets, and (b) a cover part which covers said removal opening and said engagement opening of said inner part, said cover part and said inner part being movable relative to one another in a directon perpendicular to the planes of the film sheets;
    a holding arrangement in which said cassette is received, said holding arrangement holding said cover part stationary and including a holding guide in which said inner part is movable at right angles to the planes of the film sheets away from said cover part;
    an optical arrangement;
    a transporting arrangement for transporting a selected microfiche film sheet along a predetermined transport plane extending from said holding guide to said optical arrangement; and
    an opening and positioning mechanism for moving said inner part in said holding guide relative to said stationary cover part to uncover said removal opening and said engagement opening adjacent the selected film sheet and at the same time to position the selected film sheet in the transport plane of said transporting arrangement.

2. An optical apparatus as claimed in claim 1 wherein said transport plane is located closely adjacent the first to be uncovered film sheet in said inner part when said cassette is is received in said holding arrangement such that said cover part continues to cover the successive said film sheets after the selected said film sheet is positiond in said transport plane.

3. An optical apparatus as claimed in claim 2 and further including an insertion slot in which said holding arrangement is located, and wherein said holding arrangement holds said cover part in position in said insertion slot to close said insertion slot.

4. An optical apparatus as claimed in claim 1 wherein said holding arrangement includes a fixed abutment which holds said cover part stationary.

5. An optical apparatus as claimed in claim 1 wherein said cover part completely closes said inner part until said cover part and inner part are inserted in said holding arrangement, wherein said holding arrangement includes a pair of opposed cover guide elements which are stationary and which act on opposite sides of said cover part to hold said cover part stationary, and wherein said opening and positioning mechanism includes a pair of opposed cassette guide elements which hold said inner part to said opening and positioning mechanism for movement away from said cover part.

6. An optical apparatus as claimed in claim 1 and further including a movable narrow push member located adjacent said holding arrangement at the side opposite to said removal opening such that when said push member is moved, the film sheet situated in the transport plane is advanced partly out of said inner part where the film sheet is easily transported by said transporting arrangement.

7. An optical apparatus as claimed in claim 6 wherein said transporting arrangement includes transporting rollers and a positionable carriage on which said transporting rollers are arranged in parallel fashion, said positionable carriage being displaceable in the direction parallel to the axes of rotation of said transporting rollers such that a film sheet located on said positionable carriage is selectively positionable in two axes of motion adjacent said optical arrangement.

8. An optical apparatus as claimed in claim 7 wherein said optical arrangement includes an optical axis which intersects the transport plane, and wherein said transporting arrangement includes two pairs of said transporting rollers, each pair of said transporting rollers being located on an opposite side of said optical axis and being driven at the same circumferential speed by a common drive.

9. An optical apparatus as claimed in claim 1 and wherein said transporting arrangement further includes a push member located adjacent said holding guide at the side of said removal opening of said inner part for pushing fully into said inner part a film sheet located in the transport plane and partly into said inner part.

10. An optical apparatus as claimed in claim 1 wherein said cover part engages said inner part in a sealing-tight manner, wherein said inner part and said cover part include respective engagement surfaces, and wherein said opening and positioning mechanism includes mechanical actuating elements which engage the respective engagement surfaces.

11. An optical apparatus as claimed in claim 10 wherein said cover part engages said inner part in a light-proof manner.

12. An optical apparatus as claimed in claim 10 including a lock means for locking said cover part to said inner part.

13. An optical apparatus as claimed in claim 10 wherein said removal opening and said engagement opening are located on opposite sides of said inner part, and wherein said cover part extends over the sides of said inner part and closes said openings.

14. An optical apparatus as claimed in claim 13 wherein said engagement opening in said inner part physicaly exposes a portion of an edge of the film sheets.

15. An optical apparatus as claimed in claim 10 wherein said separating guides of said inner part comprise ribs along lateral wall surfaces of said inner part and separating webs extending along said removal opening between respective said ribs.

16. An optical apparatus as claimed in claim 15 wherein said webs have an outer edge extending inwardly in a V-shaped manner from the sides toward the middle.

17. An optical apparatus as claimed in claim 10 wherein said inner part further includes a laterally projecting base panel, grooves in said base panel in which said cover part is received, and a spring-loaded latch element on said base panel which engages said cover part.

18. An optical apparatus as claimed in claim 10 wherein said cover part includes a recess on each lateral side which recess extends along only a portion thereof, and wherein said inner part includes a base panel projecting laterally beyond said recesses.

19. An optical apparatus as claimed in claim 10 wherein said inner part further includes a machine-readable coding.

20. An optical apparatus for the exposure and/or image reproduction of microfiche film sheets, comprising:
 a cassette including (a) an inner part containing a plurality of the parallel microfiche film sheets in preselected respective separating guides, said inner part including a removal opening located along an adjacent set of side edges of the film sheets and an engagement opening located along another adjacent set of side edges of the film sheets, and (b) a cover part which covers said removal opening and said engagement opening of said inner part, said cover part and said inner part being movable relative to one another to uncover said openings;
 an insertion slot providing access to said optical apparatus for said cassette;
 a holding arrangement in said insertion slot in which said cassette is received, said holding arrangement holding said cover part in position to close said insertion slot;
 an optical arrangement;
 a transporting arrangement for transporting individual microfiche film sheets along an transport plane extending from said holding arrangement to said optical arrangement;
 an opening mechanism for moving said inner part in said holding arrangement relative to said cover part to uncover said removal opening and said engagement opening adjacent the selected film sheet; and
 a positioning mechanism for positioning a selected film sheet and said transport plane in the same plane.

* * * * *